Figure 3:
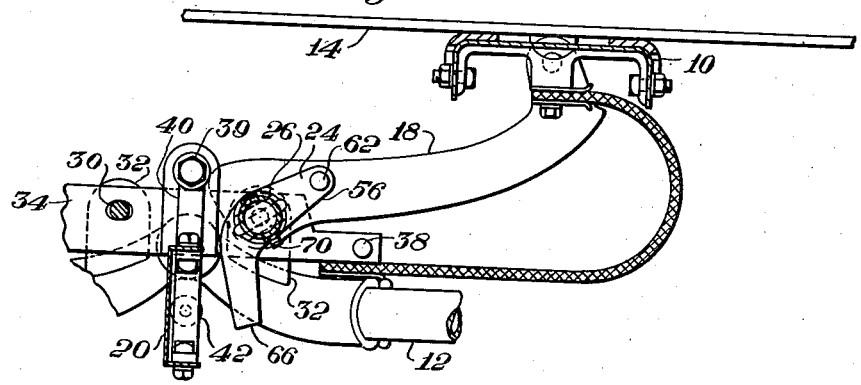

Oct. 8, 1940.                W. SCHAAKE                2,217,456
                           CURRENT COLLECTOR
                          Filed Feb. 18, 1939            2 Sheets-Sheet 1
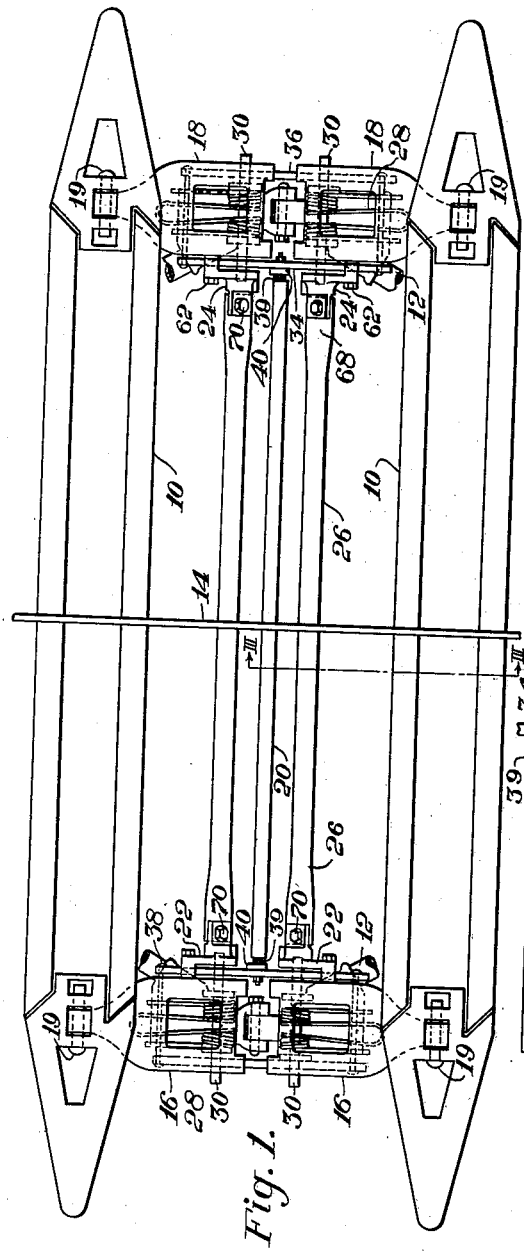
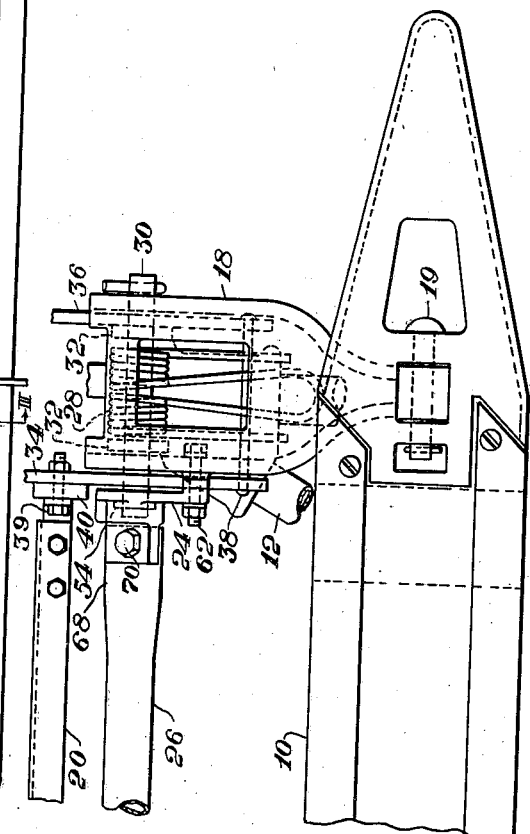
WITNESSES:
INVENTOR
William Schaake.
BY
ATTORNEY Oct. 8, 1940.  W. SCHAAKE  2,217,456
CURRENT COLLECTOR
Filed Feb. 18, 1939  2 Sheets-Sheet 2

WITNESSES:
Edward Michaels
G V Giolma

INVENTOR
William Schaake.
BY
ATTORNEY

Patented Oct. 8, 1940

2,217,456

UNITED STATES PATENT OFFICE 2,217,456

CURRENT COLLECTOR

William Schaake, Pittsburgh, Pa., assignor to Westinghouse Electric & Manufacturing Company, East Pittsburgh, Pa., a corporation of Pennsylvania Application February 18, 1939, Serial No. 257,159

4 Claims. (Cl. 191—55)

My invention relates, generally, to current collectors and it has reference, in particular, to current collectors of the pantograph type.

Where it is necessary to collect relatively heavy currents from an overhead conductor for propelling an electrically-operated vehicle, such as an electric locomotive or the like, it is customary to utilize a current collector of the pantograph type having a plurality of slider shoes mounted on a pantograph structure for engaging the trolley conductor. Because of the motion of the locomotive relative to the trolley conductor in a direction transverse to the longitudinal axis of the trolley conductor as the locomotive sways from side to side on uneven portions of the track, or is tilted from its normal position while rounding a curve, these slider shoes are elongated so as to provide a contact surface extending practically the width of the locomotive, and they are usually mounted on the pantograph structure independently of each other by means of pivoted support levers adjacent each end of the shoes, so as to allow for movement of the shoes relative to each other in order to adjust themselves to irregularities of the trolley conductor and minimize the danger of the current being interrupted through both shoes being out of contact with the conductor at the same time. When, however, the locomotive sways or tilts so that the trolley conductor engages a slider shoe adjacent one end thereof, the result with the usual arrangement of support levers is to depress the end of the slider shoe engaged by the conductor, while the opposite end of the slider shoe, being unloaded, rises. This not only increases the hazard of the raised end of the slider shoe catching in the supporting structure of the trolley conductor and causing serious damage, but it also interferes with the proper functioning of the slider shoe. Because of the tilting of the shoe from its normal operating position, increased stresses are placed on the support levers at each end of the shoe and on the body of the slider shoe itself. Wear at the bearing points of the support levers is greatly increased because of the uneven bearing pressures caused by the increased stresses, and the current collecting capacity of the shoe is appreciably reduced, since distortion of the shoe under the stresses to which it is subjected, prevents it from making proper contact with the trolley conductor.

An object of my invention, generally stated, is to provide for maintaining the proper operating relation between a slider shoe and the supporting structure thereof in a current collector of the pantograph type, under all operating conditions.

More specifically, it is an object of my invention to provide for equalizing the movement of each end of a slider shoe relative to the supporting structure thereof, in a current collector of the pantograph type by utilizing a detachable torque equalizing member.

Another object of my invention is to provide for connecting the spaced support levers of an elongated slider shoe in a current collector of the pantograph type so as to maintain a fixed operating relation between the support levers without preventing the ready removal of the support levers for inspection and repair.

A further object of my invention is to prevent unbalanced loading of the biasing means at each end of an elongated slider shoe in a current collector of the pantograph type by utilizing a substantially rigid torque member removably connected to the support means so as to equalize the loading of the biasing means.

A still further object of my invention is to provide in a simple and effective manner for maintaining a predetermined operating relation between a slider shoe and the supporting structure thereof, in a current collector of the pantograph type regardless of the point of contact of the trolley conductor with the slider shoe, so as to improve the operation of the slider shoe and generally increase the useful life of the current collector.

In practicing a preferred embodiment of my invention, support levers are pivotally attached adjacent the ends of the slider shoes in a current collector of the pantograph type for movably mounting the slider shoes on a pantograph structure on an electric vehicle. Since the support levers are pivoted so as to move in planes parallel to the line of motion of the vehicle, a wind vane is provided for cooperating with operating levers attached to the support levers, so as to neutralize the effect of wind pressure on the trailing slider shoe and prevent it from reducing the contact pressure between it and the conductor. A substantially rigid torque equalizing member is positioned between the operating levers of each slider shoe and detachably connected thereto so as to equalize the torque exerted by the support levers on the spring members which are utilized for biasing the support lever to a predetermined position, regardless of the point of contact of the trolley conductor with the slider shoe.

In this manner, even should the trolley conductor engage the slider shoe directly above the support lever at one end thereof, any tendency to depress that end of the slider shoe will result in the transmittal of part of the torque exerted by the support lever at that end to the support lever at the other end through the medium of the torque member. Accordingly, the pressure on the spring biasing members associated with the support levers will be equalized regardless of the position of the conductor on the slider shoe and the slider shoe will, under all conditions, be maintained in the proper operating position.

Figure 4:
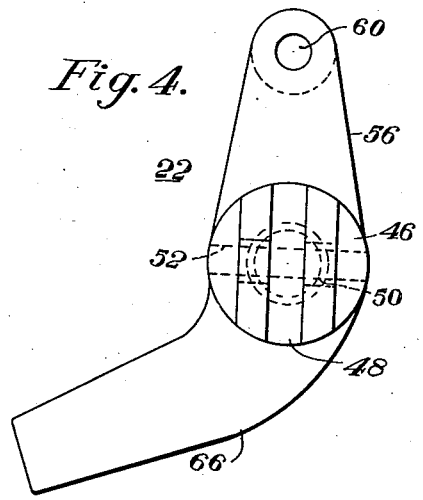
Figure 5:
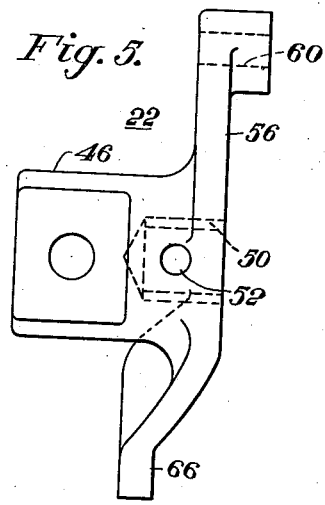
Figure 6:
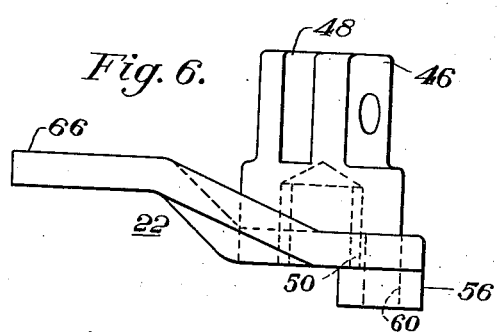

For a more complete understanding of the nature and scope of my invention, reference may be had to the following detailed description, taken in connection with the accompanying drawings, in which:

Figure 1 illustrates a plan view of a preferred embodiment of the invention in a current collector of the pantograph type, Fig. 2 is an enlarged view of a portion of the current collector of Fig. 1 showing the details of the slider shoe support mechanism and the means of attaching the torque member thereto, Fig. 3 is an enlarged sectional view of a portion of the current collector of Fig. 1 taken along the line III—III thereof, and Figs. 4, 5 and 6 are enlarged views showing details of the operating lever construction.

Referring generally to Fig. 1 of the drawings, the reference numerals 10 denote a pair of slider shoes which are disposed to be mounted on a pantograph structure 12, a portion only of which is shown, for engaging a trolley conductor 14. Support levers 16 and 18 are pivotally connected to the slider shoes 10 adjacent the ends thereof by means of pins 19, for mounting the shoes on the pantograph structure 12 in movable relation thereto. A wind vane 20 is provided for cooperating with operating levers 22 and 24, which are detachably secured to the support levers 16 and 18, respectively, for neutralizing any tendency of the wind pressure to reduce the contact pressure between the trolley conductor and the trailing slider shoe at relatively high speeds. A substantially rigid torque member 26 is connected between the operating levers 22 and 24, preferably with its longitudinal axis coincident with the axis of rotation of the pivoted support levers 16 and 18, so as to obtain equalized movement of the support levers regardless of the point of engagement of the conductor with the slider shoe and equalize the torque exerted by the support levers on the torsion springs 28, which are utilized for urging the support levers upwardly to a predetermined position.

Referring particularly to Figures 1, 2 and 3 of the accompanying drawings it may be seen that the support levers 16 and 18 are preferably mounted on pins 30 which pass through upstanding ear portions 32 of the pantograph structure 12. Parallel side members 34 and 36 are positioned on the pins 30 and connected by tie rods 38 at each end. The torsion springs 28 are mounted on the pins 30 with the end portions in engagement with the tie rods 38 and the central looped portions in engagement with the support levers as shown particularly in Fig. 2, so as to bias the support levers upwardly to a predetermined position.

The wind vane 20 comprises, preferably, a substantially flat elongated body member which is pivotally supported between the side members 34 and 36 by means of bolts 39 which pass through upstanding brackets 40 secured to the body member at each end thereof. Roller members 42 are positioned on the brackets 40 for engaging the operating levers 22 and 24 when the wind vane is actuated by the wind pressure at relatively high speeds.

Referring particularly to Figs. 4, 5 and 6 of the drawings, it will be seen that the operating levers 22 and 24 comprise bell-crank levers each having a central boss portion 46 with a transverse slot 48 therein so as to provide a clevis for receiving an end of the torque member 26. Except for the fact that the boss portions on the operating levers 22 and 24 are disposed in reversed relation, the levers 22 and 24 are similar. A central recess 50 is provided on the side of the boss portion opposite the clevis for positioning the lever on an extended portion of the pin 30, upon which the support levers 16 and 18 are mounted, and a transverse opening 52 may be provided therein for receiving means such as the cotter pin 54 for securing the support lever to the pin. An upwardly extending arm portion 56 of the operating lever is provided with an opening 60 for receiving a bolt 62 which secures the operating lever to the support lever. The downwardly extending portions 66 of the operating levers 22 and 24 are disposed to be engaged by the roller members 42 of the wind vane 26 when the wind pressure on the wind vane 20 pivots the wind vane about the bolts 39. A force is thereby transmitted to the support levers 16 and 18 of the trailing slider shoe tending to increase the contact pressure between the trailing slider shoe and the trolley conductor, so as to overcome the tendency of the wind pressure on the trailing slider shoe 10 to reduce the contact pressure between the slider shoe and the conductor 14 at relatively high speeds.

In order to maintain the proper operating relation between the slider shoe 10 and the supporting structure 12 and prevent the slider shoe from being depressed more at one end than at the other end when the trolley conductor 14 engages the slider shoe adjacent to one end with a resultant unequal loading of the torsion springs 28, the substantially rigid torque member 26 comprises, preferably, a tubular member having flattened end portions 68 which are secured in the transverse slots 48 of the operating levers 22 and 24 by suitable means, such as the bolts 70. By thus connecting the operating levers 22 and 24, which are secured to the support levers 16 and 18, respectively, equalized movement of the ends of the slider shoe is obtained. When the trolley conductor 14 engages the slider shoe 10 adjacent one end thereof, the contact pressure between the conductor and the slider shoe acts mainly on the support lever at that end. Any resultant movement of the support lever at that end is transmitted by the substantially rigid torque equalizing member to the support lever at the other end, causing it to move an equal amount in the same direction. The other end of the slider shoe is, accordingly, depressed the same amount as the end engaged by the conductor. The torsion springs 28 are thereby equally loaded, and the slider shoe is maintained in a substantially horizontal position so as to afford safe and satisfactory operation thereof.

When it is desired to remove a support lever for inspection or replacement, the bolt 62 and the cotter pin 54 are removed. The pin 30 may then be withdrawn, and by removing the pin 19 by which the support lever is attached to the slider shoe, the support lever may be removed without disturbing the connection of the torque member 26 with the support lever at the other end of the slider shoe. Removal of the torque member 26 itself may be effected by merely removing the bolts 70 at each end thereof, without in any manner otherwise disturbing the supporting structure of the slider shoes.

From the above description, taken in connection with the accompanying drawings, it will be apparent that I have provided in a simple and effective manner for equalizing the effect of the contact pressure between the slider shoe and the conductor, on the support lever torsion springs of a slider shoe in a current collector of the pantograph type, without interfering with the ready removal of the support levers from the current collector structure for inspection or replacement. Likewise, the torque member may be easily removed without disturbing the rest of the structure. Since the support levers 16 and 18 are effectively connected along their common axis of rotation by the torque member 26, the slider shoe may be maintained in the most suitable operating position at all times, regardless of the point of contact of the conductor with the slider shoe.

Distortion of the slider shoe itself, or misalignment of the support levers with respect to the slider shoe is effectively prevented. Increased stresses in the slider shoe and at the bearing points between the slider shoe and the support levers and between the support levers and the supporting structure when the trolley conductor engages the slider shoe adjacent one end are thereby prevented, thus increasing the operating efficiency of the slider shoe and the duration of service of the slider shoe and the support levers, and affording a substantial saving in repairs and replacements.

Since certain changes may be made in the above construction, and different embodiments of the invention may be made without departing from the spirit thereof, it is intended that all matter contained in the above description or shown in the accompanying drawings shall be considered as illustrative, and not in a limiting sense.

I claim as my invention:

1. A current collector comprising, a pantograph supporting structure, an elongated slider shoe for engaging an overhead conductor, support means positioned adjacent each end of the slider shoe in pivotal relation therewith for movably mounting the slider shoe, separate pin members for pivotally supporting the support means on the supporting structure, a detachable torsional torque equalizing member, and means secured to the support means for detachably connecting the torque equalizing member to the support means coaxially with the support pins for effecting equalized movement of the ends of the slider shoe under all conditions of conductor pressure.

2. In a current collector the combination of, a supporting structure, a pair of spaced apart support levers pivotally mounted on independent coaxial support pins at opposite ends of the supporting structure, an elongated slider shoe pivotally mounted on said support levers for engaging a trolley conductor, a substantially rigid torque member, and means operatively connected with the support levers and the support pins to secure the torque member thereto in coaxial relation with the support pins for maintaining a predetermined relation between the slider shoe and the supporting structure.

3. A current collector comprising, a supporting structure, a pair of elongated slider shoes for engaging a trolley conductor, a pair of support levers pivotally connected to each shoe and mounted on independent support pins at opposite sides of the supporting structure for movably mounting the shoe on the supporting structure, resilient means associated with each support lever for urging the slider shoes against the conductor, an operating lever detachably secured to each support lever having a clevis coaxially related to the support pin, a wind vane disposed to cooperate with the operating levers to adjust the contact pressure between one of the slider shoes and the conductor in accordance with the direction and rate of travel of the shoes along the conductor, and a substantially rigid torque equalizing member cooperative with the clevises for connecting the operating levers associated with one of the slider shoes to equalize the torque on the resilient means at the opposite ends of the slider shoe.

4. The combination in a current collector of, a pair of slider shoes, a supporting structure, a pair of spaced support levers pivotally connected to each slider shoe adjacent the ends thereof and pivotally mounted on separate support pins for movably mounting the slider shoe on the supporting structure, an operating lever detachably secured to each support lever having a clevis coaxial with the support pin, and a rigid torque member having the ends secured in the clevises for connecting the operating levers associated with a pair of the said support levers for equalizing the movement of the ends of the slider shoe so as to maintain the slider shoe in a predetermined relation to the supporting structure.

WILLIAM SCHAAKE.